Jan. 29, 1924.  1,482,010
J. A. HELLSTROM
CHANGE SPEED TRANSMISSION FOR LATHE FACEPLATES
Filed Aug. 10, 1923    5 Sheets-Sheet 1

INVENTOR.
John A. Hellstrom.
BY
ATTORNEYS.

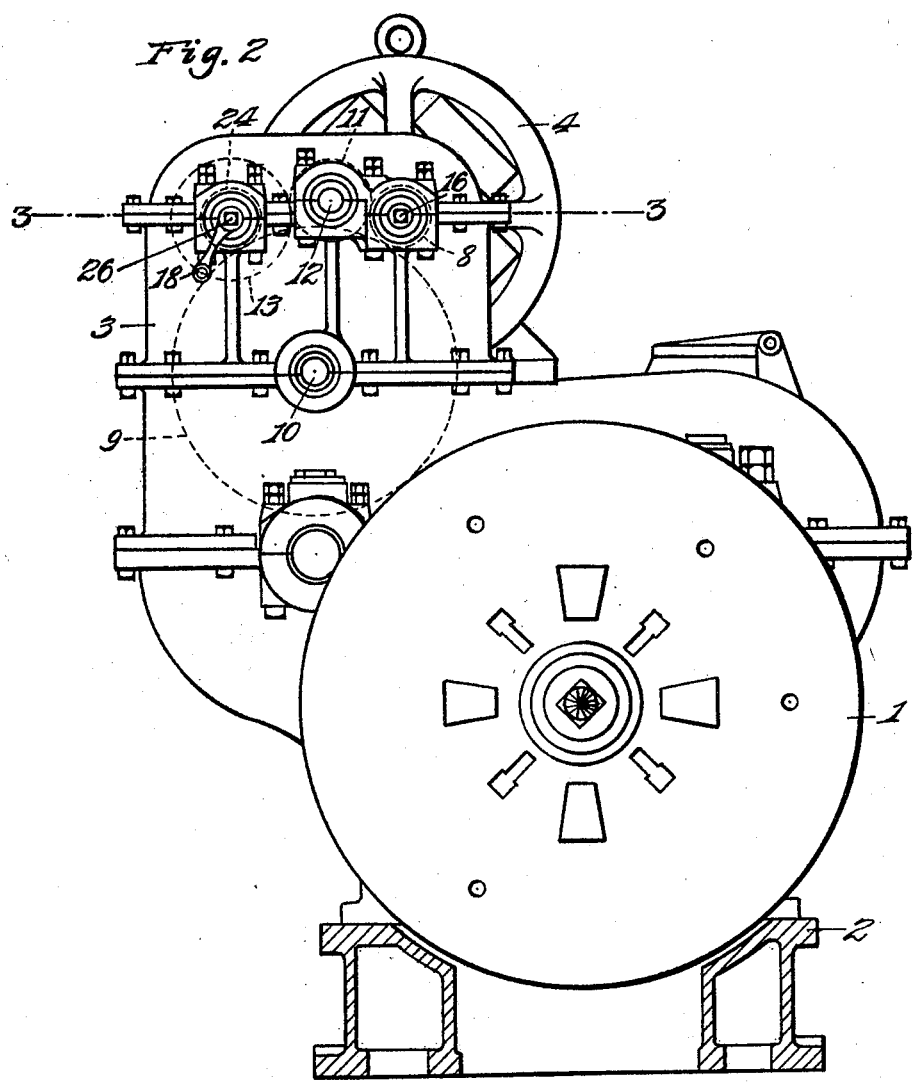

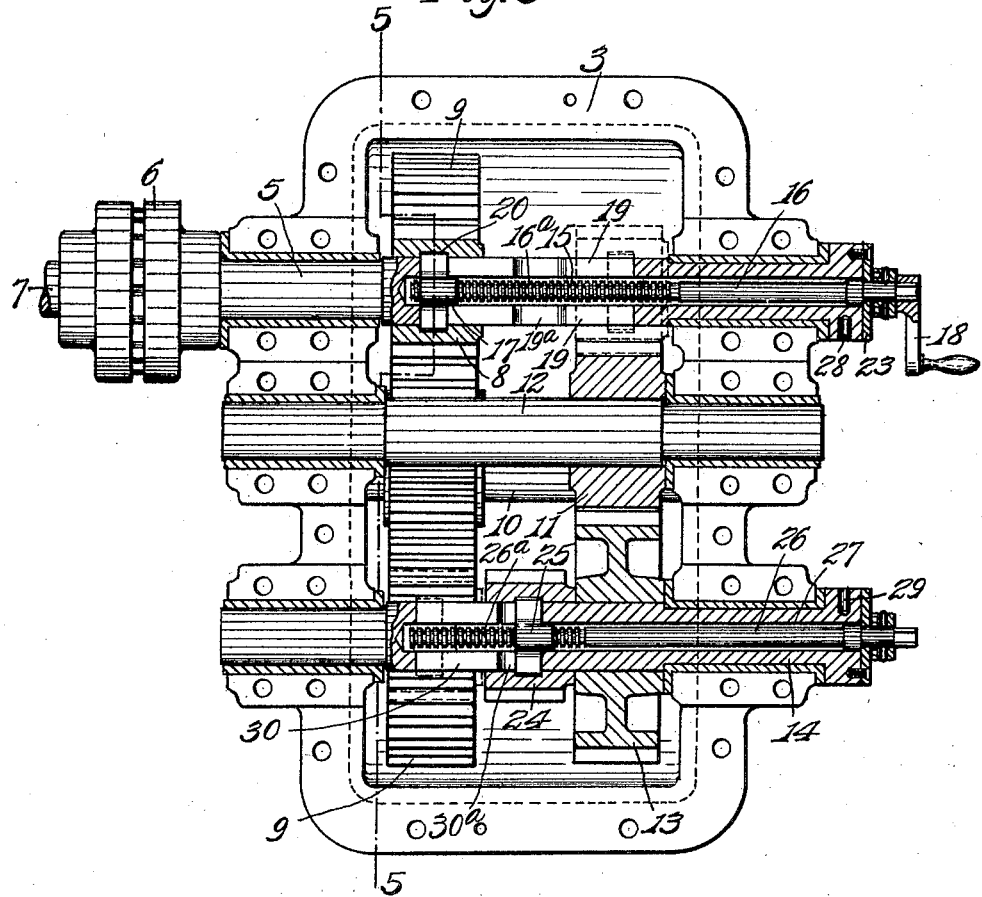

Jan. 29, 1924. 1,482,010
J. A. HELLSTROM
CHANGE SPEED TRANSMISSION FOR LATHE FACEPLATES
Filed Aug. 10, 1923   5 Sheets-Sheet 4
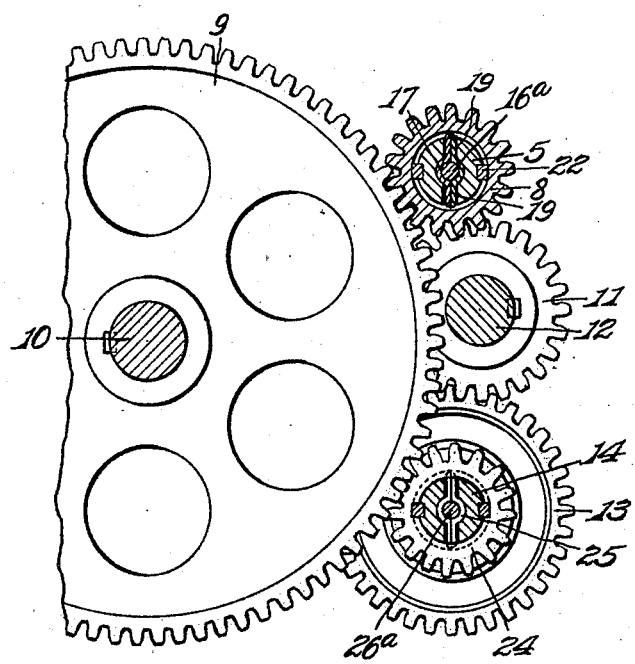
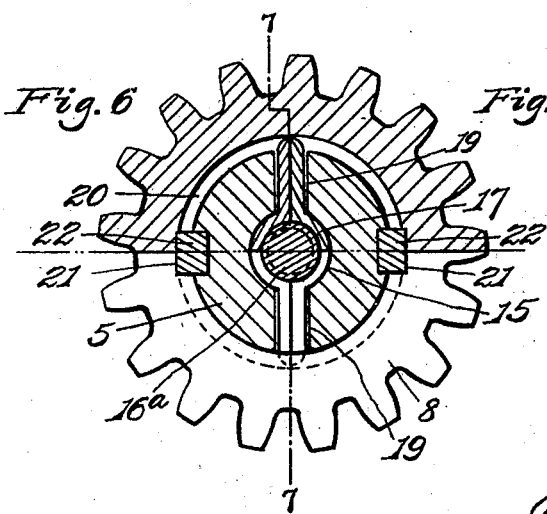
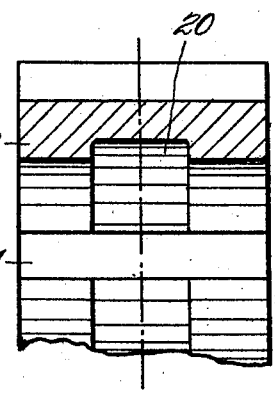
INVENTOR.
John A. Hellstrom
BY
ATTORNEYS.

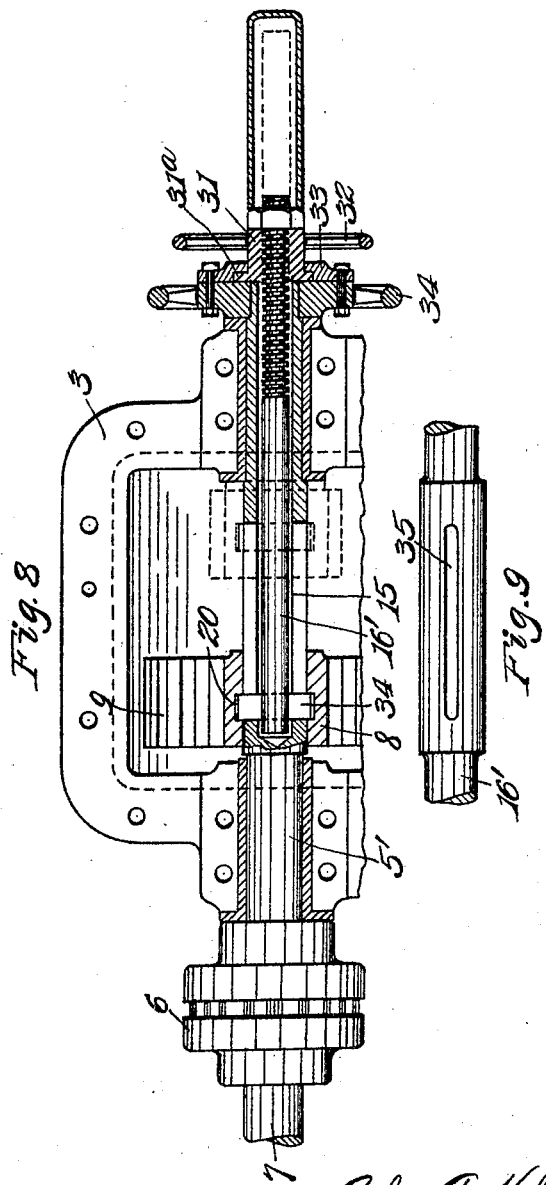

Patented Jan. 29, 1924.

1,482,010

UNITED STATES PATENT OFFICE.

JOHN A. HELLSTROM, OF WHEELING, WEST VIRGINIA.

CHANGE-SPEED TRANSMISSION FOR LATHE FACEPLATES.

Application filed August 10, 1923. Serial No. 656,635.

*To all whom it may concern:*

Be it known that I, JOHN A. HELLSTROM, a subject of the King of Sweden, and resident of Wheeling, county of Ohio, and State of West Virginia, have invented certain new and useful Improvements in Change-Speed Transmissions for Lathe Faceplates, of which the following is a specification.

This invention relates broadly to roll lathes, and more specifically to a change speed gearing for such lathes.

The primary object of the invention is to provide a change speed gearing for lathes, which permits the lathe to be operated either at low speed or at a comparatively high speed, said gearing having associated therewith a simple and conveniently operated mechanism whereby adjustment may be effected for changing from one speed to the other.

A further object is to provide a change speed gearing of the character mentioned which provides for changes of gears without the employment of a reversible motor.

With these and other objects in view, the invention resides in the features of construction, arrangement of parts and combinations of elements which will hereinafter be fully described, reference being had to the accompanying drawings, in which—

Figure 2 is an end elevation of the same with the lathe bed shown in cross section;

Figure 3 is an enlarged horizontal section on line 3—3, Fig. 2;

Figure 4 is a partial section similar to Fig. 3, showing the main drive shaft in elevation to illustrate the form of the slot therein;

Figure 5 is a detail section taken substantially on line 5—5, Fig. 3;

Figure 6 is an enlarged section of the main drive shaft, showing the shiftable gear carried thereby, the latter being shown partly in section and partly in side elevation;

Figure 7 is a partial central section of said shiftable gear, taken on line 7—7, Fig. 6;

Figure 8 is a view similar to Fig. 4, illustrating a modified form of gear shifting mechanism; and—

Figure 9 is a side elevation of a fragmentary portion of the drive shaft shown in Fig. 8.

Figure 1:
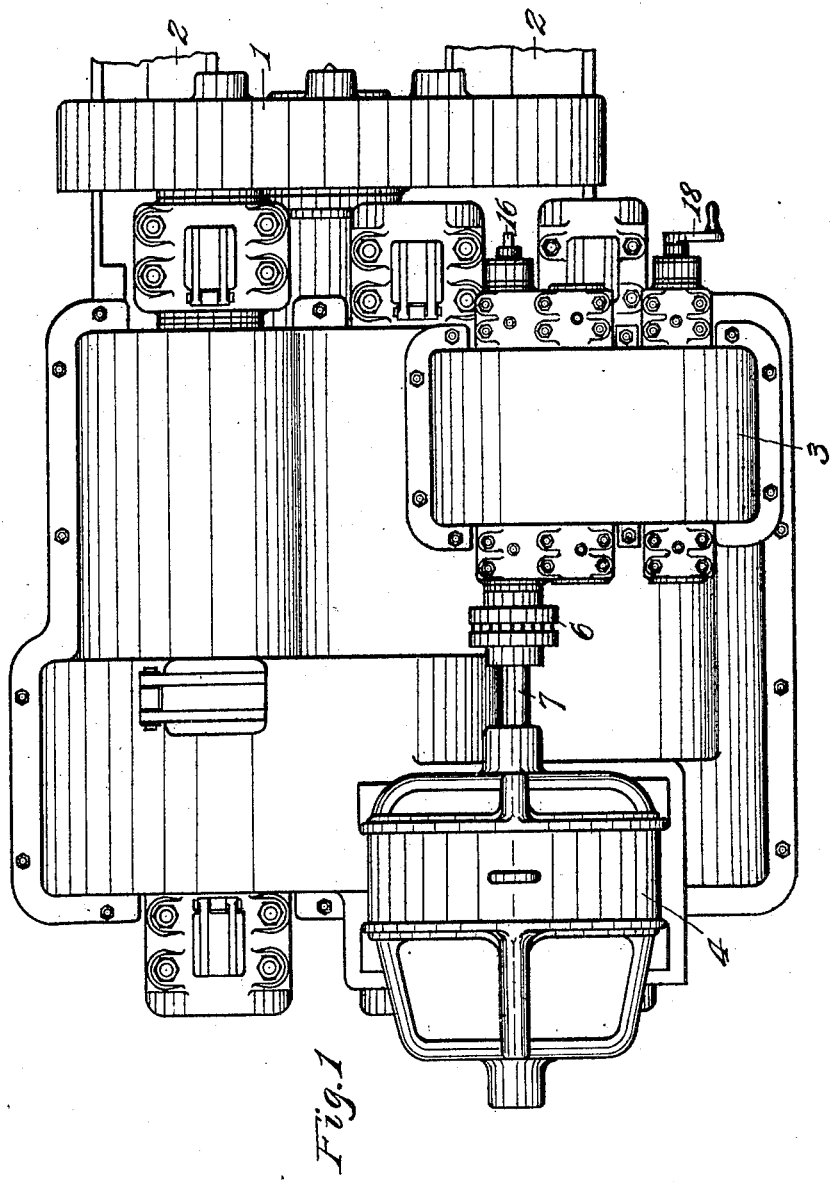
Figure 1 is a top plan view of a roll lathe headstock embodying my invention.

Referring to said drawings, 1 indicates the face plate of a roll lathe headstock, 2 the bed plate upon which said headstock is mounted, 3 a case for housing the change speed gears, and 4 an electric motor for driving said face plate through said gears.

Journaled in the gear case 3 is a main drive shaft 5 which is operatively connected at one end, as by a coupling 6, to the motor shaft 7. Said drive shaft has shiftable thereon a gear 8 adapted for being placed in driving relation either to the main drive gear 9 carried by a shaft 10, or to an intermediate idler gear 11 carried by an idler shaft 12, the last-mentioned gear being permanently in mesh with a gear 13 fixed on a low speed drive shaft 14 journaled in said case.

The drive shaft 5 has therein a bore 15 which extends from the end opposite that upon which is carried the coupling 6 to a point in a vertical plane passing through the drive gear 9, and rotatable within said bore is a rod 16 having a worm $16^a$ turned thereon. Disposed in operative relation to said worm is a sleeve nut 17 composed of two complemental halves which, through rotation of said worm, as by means of a crank 8 applied to said rod 16, is actuated to travel along said worm. Said nut is formed with radial wings which, in the travel along the worm, move in oppositely disposed slots 19 of suitable length provided in the shaft 5. The outer ends of said wings are received within an internal annular channel 20 provided therefor in the sliding gear 8, being introduced in said channel through grooves 21 in said gear prior to the introduction of keys 22 whereon said gear slides longitudinally along the shaft 5. As is apparent, rotation of the rod 16 actuates travel of the nut 17 along the worm for effecting shifting of the gear 8 between the position in which it meshes with the gear 9 and that in which it meshes with gear 11.

The worm carrying rod 16 is held in place by suitable means, as by a plate 23 attached to the outer end of the shaft 5 and seated against a shoulder formed on said rod, as shown.

When the gear 8 is disposed in the full line position shown in Fig. 3, power from the drive shaft 5 is communicated directly to the gear 9. When shifted to the position shown in dotted lines in said figure, said gear 8 drives the idler gear 11 and, through the latter, the gear 13 on the low speed drive shaft 14 for effecting driving of the latter. A gear 24 similar to the gear 8 is shiftably mounted on said shaft 14 so as to be movable into and out of operative relation to the gear 9. Sliding movement of said gear 24 is effected in a manner similar to that of gear 8, being engaged interiorly by the wings of a sleeve nut 25 similar to the nut 17 which is engaged with the worm 26ª of a rotatable rod 26 that operates in a bore 27 provided in the low speed shaft 14.

From the foregoing it will be understood that when the face plate 1 is to be driven at high speed, the gear 8 is disposed in direct driving relation to the main drive gear 9, and the gear 24 is shifted to the full line inoperative position shown in Fig. 3. When said face plate is to be driven at low speed, the gear 8 is shifted into driving relation to the idler gear 11, and the gear 24 is shifted into mesh with the gear 9.

Sockets 28 and 29 in the outer ends of the shafts 5 and 14 are adapted to be engaged by a spanner or other tool for effecting adjustment of said shafts to dispose the slots 19 and 30 of the latter in position for introducing the sleeve nuts 17 and 25 in operative relation to the worms 16ª and 26ª, respectively, said slots being increased in width, as shown at 19ª and 30ª, at intermediate points in their lengths to admit said nuts.

In the modification illustrated in Fig. 8, the shifter rod 16' has the worm thereof formed on the outer end thereof and operatively engaged by an interiorly threaded hub 31 formed on a hand wheel 32. Said hub has a circular flange 31ª which is disposed for rotation within the embrace of a keeper plate 33 attached to the outer face of a hand wheel 34, the latter being fixed upon the end of the shaft 5' and being adapted for rotary movement for disposing the teeth of the gear 8 in proper position to be moved into mesh either with the gear 8 or with the gear 11. It will be noted that in this modified device the rod 16' is bodily shifted for shifting the gear 8, whereas in the preferred form herein described the sleeve nut 17 travels along the rod, moving the gear 8 therewith. In said modification, a cross bar 34 is substituted for said sleeve nut, the same being disposed in a slot 35 provided in said rod so as to be movable to and from a position within the channel 20 of the gear 8.

The invention described provides a simple and efficient mechanism whereby adjustment may be effected for operating a roll lathe either at low speed or at comparatively high speed. Further, the arrangement of the gears and their shafts is such that when the high speed gears are operating, the low speed gears remain stationary, and that when the low speed gearing is employed, no gears remain idle.

What is claimed is—

1. A change speed transmission for lathe face plates, comprising a main transmission gear, a main drive shaft, a drive gear shiftable on said shaft, a countershaft, an idler gear fixed on said countershaft, said drive gear being shiftable into driving relation either to said main gear or to said idler gear, a low speed shaft, a gear fixed on said low speed shaft disposed permanently in mesh with said idler gear, a gear shiftable on said low speed shaft into and out of mesh with said main gear, and means carried by each the drive shaft and the low speed shaft whereby the shiftable gears are shifted.

2. A change speed transmission for lathe face plates, comprising a main transmission gear, a main drive shaft, a drive gear shiftable on said shaft, a countershaft, an idler gear fixed on said countershaft, said drive gear being shiftable into driving relation either to said main gear or to said idler gear, a low speed shaft, a gear fixed on said low speed shaft disposed permanently in mesh with said idler gear, a gear shiftable on said low speed shaft into and out of mesh with said main gear, and means carried by each the drive shaft and the low speed shaft whereby the shiftable gears are shifted, said means comprising a worm rotatable interiorly of each of the two last mentioned shafts.

3. A change speed transmission for lathe face plates, comprising a main transmission gear, a main drive shaft, a drive gear shiftable on said shaft, a countershaft, an idler gear fixed on said countershaft, said drive gear being shiftable into driving relation either to said main gear or to said idler gear, a low speed shaft, a gear fixed on said low speed shaft disposed permanently in mesh with said idler gear, a gear shiftable on said low speed shaft into and out of mesh with said main gear, means carried by each the drive shaft and the low speed shaft whereby the shiftable gears are shifted, said means comprising a worm rotatable interiorly of each of the two last mentioned shafts, and a sleeve nut operatively engaged with each of said worms and interengaged with each of said shiftable gears.

4. In a change speed transmission for lathe face plates, a shaft having a longitudinal bore, a rod rotatable within said bore and having a worm thereon, a gear shiftably mounted on said shaft, a sleeve nut mounted for travel on said worm and having radial wings, said shaft having slots through which said wings project and along which said wings move in the travel of said nut, said gear being so interengaged with said wings that it is actuated to travel with said nut.

5. In a change speed transmission for lathe face plates, a shaft having a longitudinal bore, a rod rotatable within said bore and having a worm thereon, a gear shiftably mounted on said shaft, a sleeve nut mounted for travel on said worm and having radial wings, said shaft having slots through which said wings project and along which said wings move in the travel of said nut, said gear being so interengaged with said wings that it is actuated to travel with said nut, said nut being formed of complemental sections, and said slot having a portion thereof of a width to permit of introduction of said nut sections.

In testimony whereof, I affix my signature in presence of two subscribing witnesses.

JOHN A. HELLSTROM.

Witnesses:
CHAS. C. WARNER,
EFFIE R. MEHEN.